United States Patent [19]

Van Name et al.

[11] Patent Number: 5,228,285
[45] Date of Patent: Jul. 20, 1993

[54] SOLID PROPELLANT ROCKET MOTOR CASE FOR INSENSITIVE MUNITIONS REQUIREMENTS

[75] Inventors: Frederick W. Van Name, Newark, Del.; Michael A. Gerace, Nottingham, Pa.; Robert G. Gleeson, Bear, Del.

[73] Assignee: Thiokol Corporation, Ogden, Utah

[21] Appl. No.: 843,068

[22] Filed: Mar. 2, 1992

[51] Int. Cl.$^5$ .............................. F02K 9/00
[52] U.S. Cl. ...................... 60/253; 102/481
[58] Field of Search ............ 60/39.091, 223, 253, 60/255; 102/481

[56] References Cited

U.S. PATENT DOCUMENTS

| | | | |
|---|---|---|---|
| 3,052,091 | 9/1962 | D'ooge | 60/253 |
| 4,035,180 | 7/1991 | Purcell et al. | 102/481 |
| 4,084,512 | 4/1978 | San Miguel | 102/481 |
| 4,494,373 | 1/1985 | Vetter et al. | 60/253 |
| 5,035,182 | 7/1991 | Purcell et al. | 102/481 |
| 5,038,686 | 8/1991 | Zulkoski et al. | 102/481 |
| 5,129,326 | 7/1992 | Brogan | 102/481 |

OTHER PUBLICATIONS

McGraw-Hill, Inc. "Modern Plastics Encyclopedia 1989", vol. 65, No. 11, Oct., 1988. p. 604.

*Primary Examiner*—Richard A. Bertsch
*Assistant Examiner*—Timothy S. Thorpe
*Attorney, Agent, or Firm*—Kevin E. Joyce; Ronald L. Lyons

[57] ABSTRACT

The invention is a propellant rocket motor case designed to meet insensitive munitions requirements comprising a propellant surrounded by a case having slots therein, and a wrapping around the case, the wrapping comprising a load bearing material which can withstand the hoop load on the case during normal firing of said rocket, the material also having the characteristic of losing strength or melting at undesired temperatures above normal storage temperatures, but below the autoignition temperature of said propellant, so that during undesired high storage temperatures the propellant will exhaust any subsequently generated gases, due to any subsequent propellant burning, by venting through said slots thereby avoiding any explosion or undesired operative one-way thrust.

13 Claims, 1 Drawing Sheet

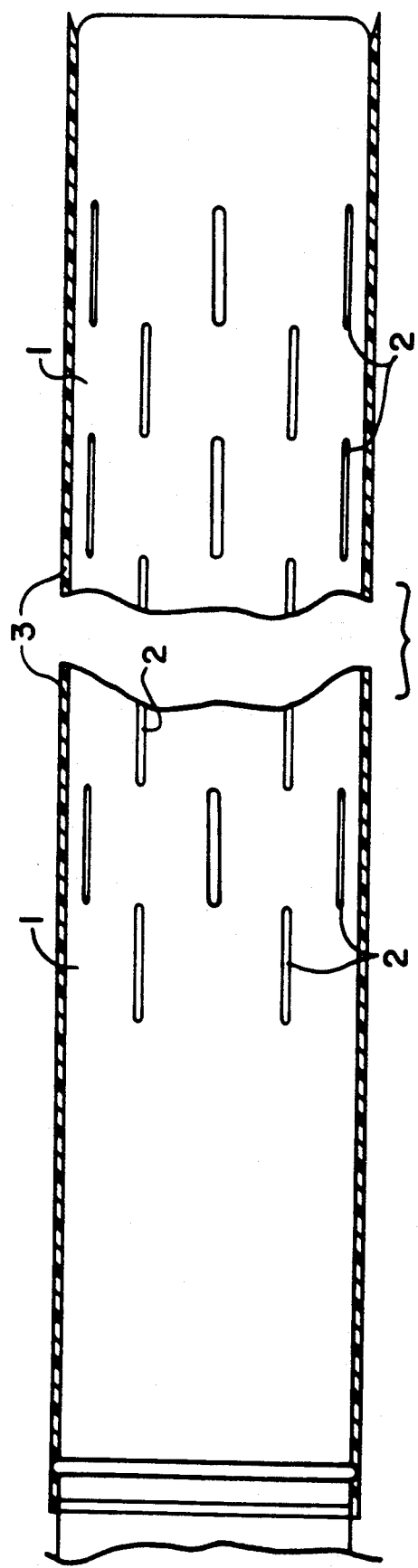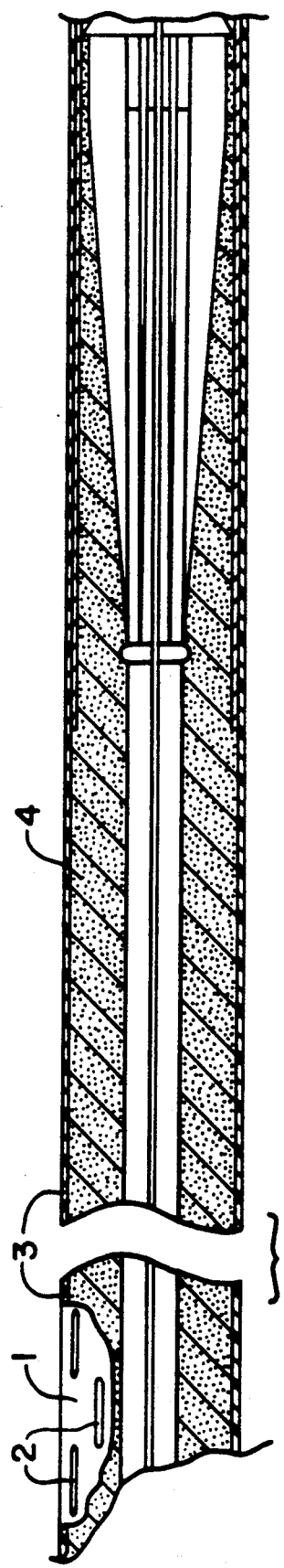

SOLID PROPELLANT ROCKET MOTOR CASE FOR INSENSITIVE MUNITIONS REQUIREMENTS

BACKGROUND OF THE INVENTION

1. Field of the Invention

This invention relates to a solid propellant rocket motor case for insensitive munitions requirements. The case is made by slotting a metal container, such as a cylinder, and overwrapping the case with fibers, impregnated with resin.

2. Description of the Prior Art

Military operations and other storage environments provide a potential for undesired heat, such as from a fire, in the vicinity of rocket motors in storage or in use prior to a normal firing. An exposed rocket motor can react to exposure to heat and/or flames in a short time. The undesired heat and/or flames can cause a violent explosion or uncontrolled thrust due to autoignition of propellant resulting in the rocket firing but being out of control.

The burning of a propellant material within the case produces gases which are controllably released through a nozzle to produce thrust for propelling a rocket motor during normal firing. The propellant material is ignited for such use by an igniter system. However, each type of propellant material has an autoignition temperature, that is, a temperature at which the propellant will automatically ignite. The propellant material for a particular rocket motor is thus selected to have an autoignition temperature which is substantially greater than the ambient or normal temperature range for storage of the rocket motor prior to its use. If, due to an unexpected fire near a stored rocket motor, the propellant material in the rocket motor becomes so hot that it autoignites, not only may the fire hazard become increased but the rocket motor may become propulsive thus magnitudinally increasing the catastrophic damage which may occur. Also, while such a danger of propulsion may not be prevalent with other kinds of gas generators, it would still be desired to prevent catastrophic burst hazards from a high buildup of pressure within any gas generator.

Past efforts to improve the heat resisting capability of ordnance items have included placing a thermal barrier on the exterior of the rocket motor casing or warhead. By thermal insulation of the rocket motor casing or explosive, the length of time the ordnance item can be exposed to fire without reaction is increased. If the fire is not extinguished within a short period of time, the internal temperature will increase and the ordnance item may ignite and explode.

Explosion and violent rupture of a heat weakened motor can occur when the propellant grain is ignited along the central void in the grain. If combustion can be limited to the outside of the grain and properly vented, the severity of the reaction is lessened.

U.S. Pat. No. 4,458,482 addresses the problem by carefully aligning bare patches in the insulating coating of the propellant shaped to coincide with stress patterns to aid venting.

U.S. Pat. No. 4,442,666 uses carefully aligned gaps in the insulation along the inside of the casing carefully arranged so as not to be opposite radial grooves in the propellant, causing rupture of the casing to vent the propellant at the specially placed gaps in the insulation.

U.S Pat. No. 4,411,199 has a metallic cap for a missile fuse booster with apertures covered by an inner cap of a thermoplastic which melts to vent through the aperture and prevent the booster charge from exploding at higher temperatures, when not in actual use.

U.S. Pat. No. 4,838,166 similarly has bores filled with meltable material to vent an explosive charge at prolonged undesired higher than ambient temperatures.

Finally, U.S. Pat. No. 5,060,470 discloses a ventable rocket motor or other gas generator case which is ventable at a temperature between ambient and autoignition for the propellant by memory metal members interleaved between plies of the composite of the casing.

SUMMARY OF THE INVENTION

The invention is a propellant rocket motor case designed to meet insensitive munitions requirements comprising
 a propellant surrounded by a case having slots therein, and
 a wrapping around the case, the wrapping comprising a load bearing material which can withstand the hoop load on the case during normal firing of said rocket, the material also having the characteristic of losing strength or melting at undesired temperatures above normal storage temperatures but below the autoignition temperature of said propellant, so that during undesired high storage temperatures the propellant will exhaust any subsequently generated gases, due to any subsequent propellant burning, by venting through the slots thereby avoiding any explosion or undesired operative one-way thrust.

Preferably, the wrapping is comprised of fibers impregnated with resin.

Any fiber can be used if the resin loses strength or melts at the previously-mentioned undesirable temperature. The preferred fiber is oriented, ultra high molecular weight, very high strength polyolefin, more preferred polyethylene, such as SPECTRA ® 1,000 from Allied-Signal.

Any resin can be used if the fiber loses strength or melts at the previously mentioned undesired temperature. Any epoxy resin or epoxy system can be used. The preferred resin is an ultraviolet light initiated room temperature curable resin, preferably an epoxy, such as Loctite FMD-180 with FMD-181 hardener.

Thus, it can be seen that either the fiber or the resin, or both, must lose strength or melt at the undesired temperatures above normal storage temperatures.

The case is preferably cylindrical, but could have a polygonal cross-section.

The case wrapping preferably would begin to lose strength at about 180° F.

In another embodiment, this invention is a method for venting any possible undesired gases from a propellant in a rocket motor case exposed to undesired temperature above normal storage temperatures but below the autoignition temperature of the propellant comprising
 making slots in the case, and
 overwrapping the case with a material which can withstand the hoop load on the case during normal firing of the rocket, the material also having the characteristic of losing strength or melting at the undesired temperature above normal storage temperatures but below the autoignition temperature of the propellant, so that any subsequently generated, undesired gases from the propellant are vented through the slots thereby avoiding any undesired, one-way thrust or explosion.

BRIEF DESCRIPTION OF THE DRAWINGS

FIG. 1 is a cross-sectional, side view of an embodiment of the rocket motor case of this invention, showing the case with no propellant.

FIG. 2 is another cross-sectional, side view of an embodiment of the rocket motor case of this invention showing the propellant which is cut away in one section to show slots.

DESCRIPTION OF PREFERRED EMBODIMENTS

An example of the case assembly is illustrated in the attached FIG. 1. In FIG. 1 the cross-sectional, side view of an embodiment of a rocket motor case of this invention shows a case 1, having slots 2 cut therein and overwrapped with overwrap 3. The slotted case assembly can have numerous configurations and is not limited exclusively to the one shown. Variations to this design could include but are not limited to the following:

1) Number and Orientation of Slots
2) Diameter, Width and Length of Slots
3) Diameter and Length of Case
4) Case Material The composite overwrap can also be a variety of materials. Examples of possible fiber polymer candidates are listed below:

1) Polyolefin, e.g. Spectra ®
2) Graphite
3) Polyaramid, e.g. Kevlar ®
4) Liquid Crystal Polymers
5) Fiberglass When the selected matrix resin does not melt or lose strength at the undesired temperature, then the fiber polymer must be selected to do so, e.g. a polyolefin or other strong, but relatively low meltable, fiber which would lose strength at the undesired temperatures should be used.

The matrix resin could be either thermosetting or thermoplastic, such as the examples listed below:

1) Epoxy
2) Acrylic
3) Phenolic
4) Polyester, such as polybutyl terephthalate or polyethylene terephthalate
5) Nylon, including type 6, type 6, 6, etc.
6) Polyetherimide When the selected composite fiber, such as graphite, does not melt or lose strength at the undesired above normal storage temperature, then the matrix resin must be selected to do so, e.g. an epoxy or other resin which loses strength at the undesired temperatures should be used.

The invention supplies a low cost method to meet insensitive munitions (IM) requirements. The compliance to IM requirements has been demonstrated by the design illustrated in FIGS. 1 and 2. In FIG. 2, like numbers indicate like items in FIG. 1, additionally, propellant 4 is shown. This design, constructed with materials in the Example, below, has been subjected to and passed Fast Cook-Off, Slow Cook-Off and Bullet Impact tests.

The Fast Cook-off test was performed by suspending the motor assembly above a kerosene fuel fire. The composite overwrap began to burn and melt at 25 seconds. The propellant outer diameter began to burn through the slots at 47 seconds. The propellant gases vented through the slots with no explosions or debris passing through thereby meeting all test requirements.

The Slow Cook-off test was performed by slowly heating the motor assembly at a rate of 6° F./hour, until motor ignition. Ignition occurred after 36 hours and a final temperature of 382° F. The farthest debris was found 14 feet from the test stand which is within the 50 feet requirement.

The Bullet Impact test was performed by firing a single 50 caliber bullet through the motor assembly. The result of this test was a hole completely through the motor assembly with no propellant ignition thereby meeting all test requirements.

EXAMPLE

The casing shown in FIG. 2 is overwrapped with Spectra 1,000, oriented, ultra high molecular weight polyethylene fiber of 2600 denier. The fiber is impregnated with Loctite FMD-180 epoxy resin with FMD-181 hardener either before, during (or least desirably after), wrapping with five hoop wrap layers of fiber, which are made over the casing, laying the fibers in a side-by-side fashion with each ply. The resin is then cured by any ultraviolet light source in just a few minutes. The metal cylinder is sized to carry the axial component of the pressure and the fiber overwrap thickness is designed to carry the entire hoop load. By using a polyolefin fiber such as Spectra 1000 the hoop wraps lose strength rapidly above 180° F. which allows the propellant gas to vent through the slots. Using the UV initiated resin with a room temperature cure minimizes thermally induced stresses due to the mismatch in coefficients of thermal expansion. The UV initiated resin also eliminates the need for a high temperature cure.

While the invention has been described in connection with what is presently considered to be the most practical and preferred embodiments, the invention is not limited to the disclosed embodiment but, on the contrary, is intended to cover various modifications and equivalents included within the spirit and scope of the following claims.

We claim:

1. A propellant rocket motor case designed to meet insensitive munitions requirements comprising
   a propellant surrounded by a case having slots therein, and
   a wrapping around said case, said wrapping comprising a load bearing material which can withstand the hoop load on said case during normal firing of said rocket, said material also having the characteristic of losing strength or melting at undesired temperatures above normal storage temperatures but below the autoignition temperature of said propellant, so that during undesired high storage temperatures said propellant will exhaust any subsequently generated gases, due to any subsequent propellant burning, by venting through said slots thereby avoiding any explosion or undesired operative one-way thrust.

2. The case of claim 1 wherein said wrapping is comprised of fibers impregnated with a resin.

3. The case of claim 2 wherein the fiber loses strength or melts at said undesired temperatures.

4. The case of claim 3 wherein said fibers are comprised of an oriented ultrahigh molecular weight, very high strength polyolefin.

5. The case of claim 4 wherein said polyolefin is polyethylene.

6. The case of claim 2 wherein the resin loses strength or melts at said undesired temperatures.

7. The case of claim 6 wherein the resin is an ultraviolet light initiated room temperature curable resin.

8. The case of claim 6 wherein the resin is an epoxy.

9. The case of claim 7 wherein the resin is an epoxy.

10. The case of claim 1 wherein said case is cylindrical.

11. The case of claim 1 wherein the case has a polygonal cross-section.

12. The case of claim 1 wherein said wrapping loses strength beginning at about 180° F.

13. A method for venting any possible undesired gases from a propellant in a rocket motor case exposed to undesired temperature above ambient but below the autoignition temperature of said propellant comprising
    making slots in said case, and
    overwrapping said case with a material which can withstand the hoop load on said case during normal firing of said rocket, said material also having the characteristic of losing strength or melting at said undesired temperature above normal storage temperatures but below the autoignition temperature of said propellant, so that any subsequently generated, undesired gases from said propellant are vented through said slots thereby avoiding any undesired explosion or one-way thrust.

* * * * *